United States Patent
Gill et al.

(10) Patent No.: US 7,353,264 B2
(45) Date of Patent: Apr. 1, 2008

(54) METHOD AND APPARATUS FOR OPTIMIZING CLIENT RESPONSIVENESS AND SERVER PERFORMANCE

(75) Inventors: Rajpal Singh Gill, Rocklin, CA (US); Harold Todd McMillan, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 676 days.

(21) Appl. No.: 10/293,091

(22) Filed: Nov. 13, 2002

(65) Prior Publication Data
US 2004/0090450 A1    May 13, 2004

(51) Int. Cl.
*G06F 15/173* (2006.01)
(52) U.S. Cl. .............. 709/223; 709/203; 709/217; 709/224
(58) Field of Classification Search ........... 709/203, 709/217, 219, 223, 224
See application file for complete search history.

(56) References Cited

U.S. PATENT DOCUMENTS

| | | | |
|---|---|---|---|
| 5,862,330 A * | 1/1999 | Anupam et al. ............ 709/204 |
| 5,954,798 A * | 9/1999 | Shelton et al. ............ 709/224 |
| 6,049,671 A | 4/2000 | Slivka et al. |
| 6,282,175 B1 | 8/2001 | Steele et al. |
| 6,295,551 B1 * | 9/2001 | Roberts et al. ............ 709/205 |
| 6,397,256 B1 * | 5/2002 | Chan et al. ................. 709/229 |
| 6,449,739 B1 | 9/2002 | Landan |
| 6,631,412 B1 * | 10/2003 | Glasser et al. ............ 709/224 |
| 6,658,466 B1 * | 12/2003 | Ellestad et al. ............ 709/224 |
| 6,763,789 B1 * | 7/2004 | Liang et al. ............. 123/90.11 |
| 6,829,585 B1 * | 12/2004 | Grewal et al. ................. 705/8 |
| 6,859,822 B2 * | 2/2005 | Olkin ......................... 709/206 |
| 7,024,630 B2 * | 4/2006 | Himmel et al. ............. 715/747 |
| 7,093,020 B1 * | 8/2006 | McCarty et al. ............ 709/229 |

\* cited by examiner

*Primary Examiner*—Lashonda Jacobs

(57) ABSTRACT

A method and apparatus for providing on line assistance to an end user who is experiencing a problem with a computer. The computer includes a display, a monitoring unit, and a browser. The browser is loaded on the computer and is configured to establish an on-line session with another computer when the browser is enabled. The monitoring unit periodically monitors the other computer for any messages destined for the computer when the browser is closed.

21 Claims, 3 Drawing Sheets

FIGURE 3

| Time Interval | Polling Rate | Total Queries For This Interval | Overall Total Queries |
|---|---|---|---|
| 1st hour | Every minute | 60 | 60 |
| 2nd & 3rd hours | Every 5 minutes | 24 | 84 |
| 4th through 6th hours | Every 15 minutes | 12 | 96 |
| 7th through 96th hours | Every 30 minutes | 180 | 276 |

METHOD AND APPARATUS FOR OPTIMIZING CLIENT RESPONSIVENESS AND SERVER PERFORMANCE

BACKGROUND OF THE INVENTION

1. Field of the Invention

The present invention relates to a method and apparatus for providing notification to an end user of a new message from a call center agent.

2. Description of the Related Art

There exist different types of conventional systems for providing on-line help to computer users. For example, when a user experiences a problem with his or her computer, the user may telephone a designated number (e.g., 1-888- . . . ) in order to obtain assistance from a computer expert. The computer expert is typically physically located at a Support Site, whereby other computer experts are also physically located at the same Support Site in order to be able to assist more than one customer at the same time. The assistance provided may be a free service, or there may be a fee required. Typically, whether the assistance is free or not depends on whether the telephone call by the user is made during the warranty period (e.g., within three months of the purchase date of the computer).

When the user calls the designated telephone number to obtain assistance from a computer expert, the user is provided assistance from the computer expert in order to correct the problem with the user's computer. The user typically may have to wait on the telephone line for a period of time, while the computer expert researches the computer problem described by the user and develops possible solutions to that problem. The computer expert may review manuals that describe various computer problems and possible solutions to those problems, and/or the computer expert may query other computer experts at the Support Site for their advice in solving the problem.

There also exist conventional systems for providing on-line support to an end user. For example, if an end user is experiencing a problem with his or her computer, such as a problem with his or her Hewlett-Packard HP Vectra™ computer, the end user has the option to contact an HP Support Specialist by way of an Internet connection. Such an Internet connection may be provided by using software tools produced by Motive Communications, Incorporated. One such software tool is called ServiceNet, which is designed around a self-help paradigm in which a person using a desktop computer notices a problem and then manually opens a "trouble ticket" that is transmitted to a support provider.

In one implementation of ServiceNet, when a user of a personal computer (PC) detects a problem, the user clicks on a "service" icon (on the user's desktop or within an application, for example) that causes a web browser to bring up a web-based user interface that provides the user with a form into which the user may enter a description of the problem. This forms the "trouble ticket" described previously. The PC operator uses a web interface to report the problem to a program called Chorus Client, which is an incident escalator. The incident escalator first may try to run prewritten diagnostic scripts or provide "self-help" tools. It may then "isolate" the incident, running scripts to gather configuration data, and then combining the user's problem description and the configuration data with contact information identifying the user of the computer and including such things as name, e-mail address, and telephone number. It may also gather host information from the PC. These are transmitted to an incident receiver which parses the information and passes it on to a central analysis server. At the central analysis server, a program called Duet, in combination with a program called Insight, enables the provision of "online" assistance by a service engineer to review the problem in the context of the user's computer as configured and to provide assistance. Each separate incident report is assigned a case number, and there may be many different case numbers being acted on by one or more service engineers-at the same time.

Preferably, the end user who submitted the "trouble ticket" via an Internet browser still has that Internet session open, whereby any messages from the service engineer assigned to help the end user solve the problem will appear on a "window" on the user's computer that is assigned to the "open" Internet browser. When a message from the service engineer appears on the corresponding browser window on the end user's computer, the end user can then attempt to fix the problem by way of the instructions provided in the message.

However, if the end user is now occupied by a different task after having submitted the "trouble ticket", there is a possibility that the end user may not know that a message from the service engineer has arrived. This would happen if the end user has closed the browser window that was used to contact the service engineer and to establish and maintain the on-line session.

Therefore, there is a need to provide a way to notify the end user of a message from a service engineer assigned to help the end user solve his or her problem, without unnecessarily using up computer network resources.

SUMMARY OF THE INVENTION

According to one aspect of the invention, there is provided an on-line assistance system or method. The on-line assistance system or method includes a first computer that has: a display, a monitoring unit loaded on the first computer, and a browser loaded on the first computer and configured to establish an on-line session with a second computer when the browser is enabled. The monitoring unit periodically monitors the second computer for any messages destined for the first computer when the browser is closed.

BRIEF DESCRIPTION OF THE DRAWINGS

The embodiments of the present invention will become more fully apparent from the following detailed description when read in conjunction with the accompanying drawings with like reference numerals indicating corresponding parts throughout, wherein:

FIG. 3 is a table showing a polling strategy that can be used in accordance with a second or third embodiment of the invention.

DETAILED DESCRIPTION OF THE INVENTION

Several embodiments of the invention will be explained below with reference to the accompanying drawings.

The present invention relates to a system and method for providing notification to an end user of a new message from a call center agent.

Figure 1:
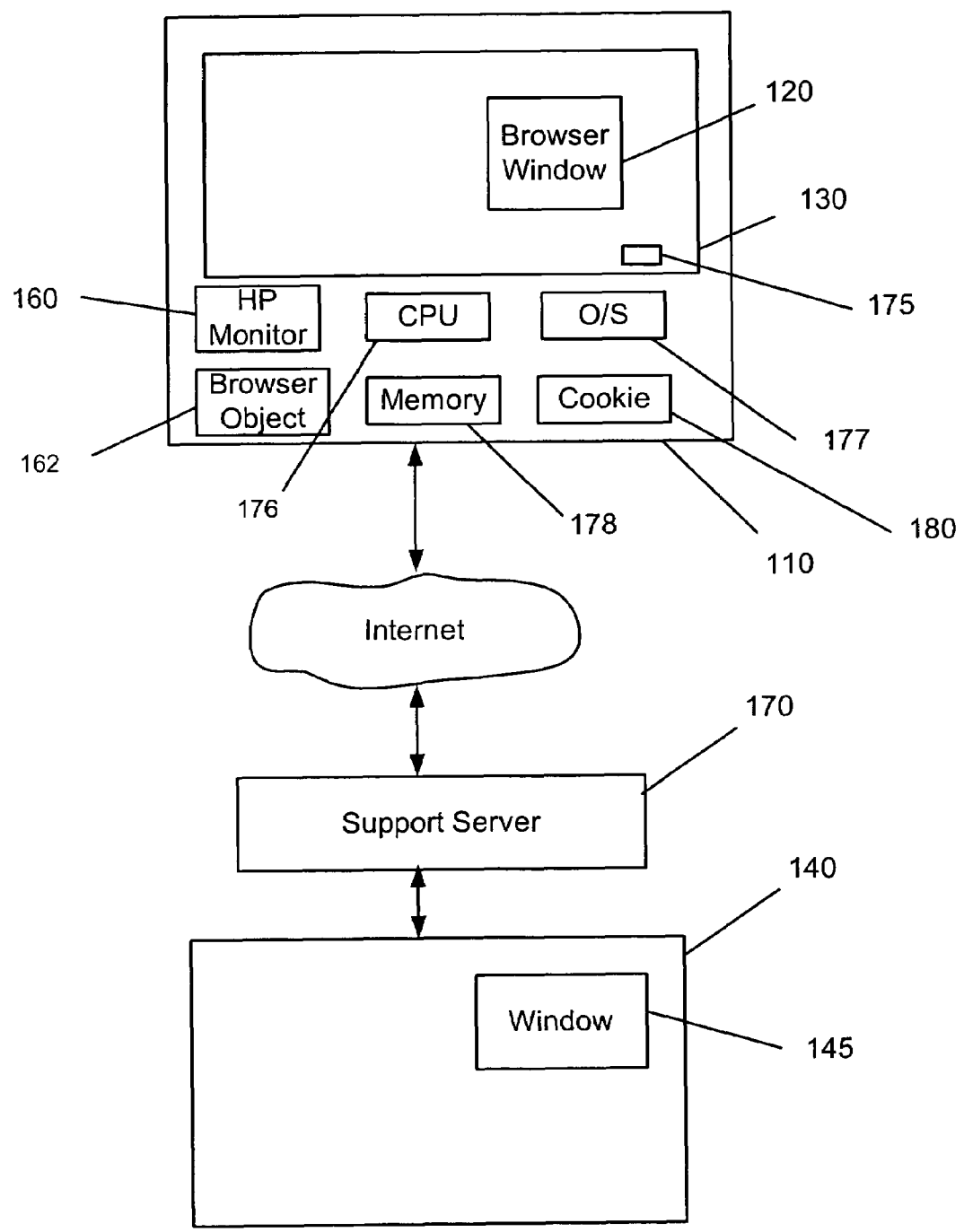
FIG. 1 is a diagram showing elements utilized in a system in accordance with a first embodiment of the invention.

Referring now to FIG. 1, an end user computer 110 includes an Operating System (O/S) 177, a CPU (or processor) 176, an HP Monitor 160, a Browser Object 162 (which, when launched, opens a Browser Window 120), and a Memory 178. When an end user has filled out a "trouble ticket" on-line on his or her personal computer 110, and has established an on-line session with a service engineer at a support site, the end user waits to receive a response from the service engineer on a browser window 120 that is open on the end user's computer display 130 and this is used to conduct a "chat session" between the end user and the service engineer. A chat session provides for a synchronous communications between parties, unlike an asynchronous e-mail communications approach. Like the browser window 120 on the end user's computer display 130, a browser window 145 is open on the display of the service engineer's computer 140 to allow for synchronous communications by way of messages between the end user's computer 110 and the engineer's computer 140 that is accomplished by way of a support server 170. In such a manner, the end user and the service engineer can communicate with each other in real time, by way of back-and-forth messages sent between the end user's computer 110 and the service engineer's computer 140, in order to hopefully solve the end user's computer problem in an expeditious manner.

As explained earlier, such a chat session works fine if both parties are responding quickly to messages from the other party. However, if the end user has to work on another task, and cannot wait for a response from the service engineer, the end user may have closed the browser window that provided the "chat session" with the service engineer, especially if the end user needs the entire display for a particular task that the end user is working on. In this case, if the service engineer sends out a response to the end user, the end user would not know about the response until the end user has re-opened the browser window at a later point in time. Accordingly, much time may be wasted to resolve the computer problem, which can result in loss of productivity to the end user. Also, end users may be frustrated in that when they do not receive responses quickly from service engineers, they may think that they are not getting high priority with respect to their particular computer problem, when in fact the solution to their problem was found quickly by the service engineer and a message containing the solution is waiting to be picked up at the support server but cannot be picked up since the end user's browser is closed. Accordingly, some end users may not want to use on-line computer support services in the future.

The present invention has been created with the end user in mind, in order to provide him or her with a notification as soon as a message is output by a service engineer, even when the end user has previously closed an Internet browser window that was used to establish an on-line connection with the service engineer.

Figure 2:
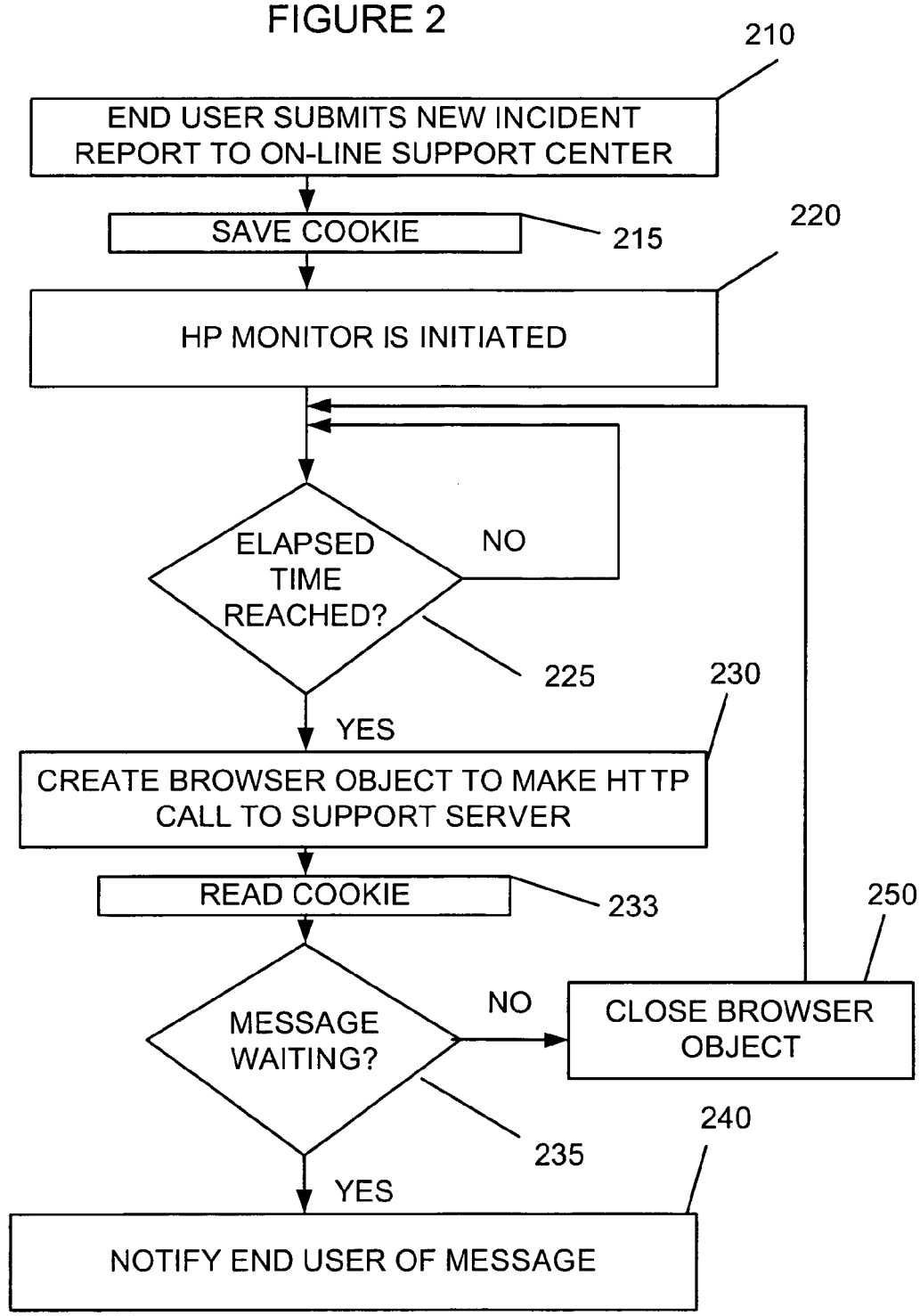
FIG. 2 is a flow diagram showing steps utilized in a method according to the first embodiment of the invention.

In the first embodiment, the HP Monitor 160 is a software application that is installed on the end user's computer 110 as a JAVA program when the end user initiates an online help session with a support site. Referring now to FIG. 1 and to FIG. 2, when the end user needs assistance on-line and submits a new incident to an on-line support center (step 210) such as an HP Support Center, the HP Monitor 160 is initiated (step 220).

In the first embodiment, the HP Monitor 160 checks for any new messages by counting an elapsed time from when the incident was first submitted (step 225), and by periodically creating a browser object 162 (e.g., an object which invokes an Internet Explorer browser) that makes an http call to the on-line support center server 170 (e.g., HP Instant Support Server) through a browser (step 230) opened by the browser object 162. By way of example and not by way of limitation, the HP Monitor 160 creates a new browser object that makes an http connection to check for new messages on the on-line support center server 170 at every one minute of elapsed time.

By way of the HP Monitor 160, even if the end user has closed the browser object 162 (and thus causing the closing of the browser window 120 on the computer display 130) that he or she had earlier opened in order to initiate the incident report process to the on-line support center, such as to have the end user's computer display 130 entirely dedicated for a task that the end user must complete in a hurry, the end user is still notified in real time that a message from the service engineer is available to be read. That way, the end user can then stop his or her current task, read the message or messages by way of the new browser object that was opened by the HP Monitor 160, and then hopefully fix the computer problem on the end user's computer 110.

In the first embodiment, when the end user has closed his or her browser, software on the end user's computer 110 (which has been downloaded from the HP Instant Support Server 170 when the end user initiated the online help session with the support site), which is named hpmon.exe (HP Monitor 160) in the first embodiment, periodically performs a check on the HP Instant Support Server 170 for any messages waiting for the end user's computer 100. The HP Monitor 160 performs this check by using the browser object 162 as a communication vehicle to periodically communicate with the HP Instant Support Server 170 over the Internet. When the end user originally creates an incident (case), the web browser saves pertinent user information in the form of a Cookie 180 (step 215), and the web browser object 162 obtains this information (step 233) before establishing an online connection with the HP Instant Support Server 170.

In more detail, when the end user initiates an online help session with the HP Support Site, the hpmon.exe application (e.g. JAVA application) is downloaded from the HP Instant Support Server 170 to the end user's computer 110. If the end user has a message waiting for him or her at the HP Instant Support Server 170 (Yes in step 235), the end user is notified of that message by the HP Monitor 160 (step 240) if the end user has closed his or her browser. If the end user has his or her browser open and in contact with the pertinent online support web site, then the HP Monitor 160 is not needed, since in that case the end user will be receiving messages from the support specialist on an open chat window. However, if the browser object 162 is open but to a different URL, then the HP Monitor 160 notifies the end user that a message from the support specialist is awaiting their review.

When the end user first sets up an on-line assistance session with the support center, the end user is assigned a unique Case Number by the support center, in order to distinguish that particular help session from any previous and current support sessions for that end user and for other end users currently seeking assistance from the Support Center. If no message for the end user is currently stored in memory at the HP Instant Support Server 170 (No in step 235), then the browser object 162 created by the HP Monitor 160 is closed (step 250), and the process returns back to step 225 to count a time period until the next check is to be made (e.g., one minute from the time when the most recently opened browser object 162 was opened and performed its check).

In the first embodiment, a polling clock begins when the end user sends a message to the HP Support Agent. The HP Monitor 160 will continue to poll for a reply until a reply is received or until a predetermined amount of time has passed. By way of example and not by way of limitation, the HP Monitor 160 will continue to poll for a reply from the HP Support Agent every minute, up to a maximum elapsed time of 96 hours from when the first message was sent from the end user to report the computer problem to the HP Support Agent. After the 96 hours has elapsed without finding any new message from HP Support Agent on the Support Server 170, the HP Monitor 160 will remove itself from the end user's computer 110.

In an implementation of the first embodiment, when the browser object 162 is closed or if it is open and the browser is pointing to a different web page than the online support web page, then the HP Monitor 160 will create an icon 175 on a tool bar at the bottom of the computer display 130 (along with icons for other "minimized" applications on the end user's computer 110), whereby the icon 175 will "flash" to thereby notify the end user that a message from the HP Support Agent has arrived. When the browser window 120 has been minimized (but not closed) by the end user, then the HP Monitor 160 will not create a flashing icon, since in that case the end user has purposely intended to not be notified of any new messages from the HP Support Agent. Furthermore, even in the case when the browser object 162 is open and the end user has not responded to the last message from the HP Support Agent for at least a fixed amount of time (e.g., 10 minutes), then the HP Monitor 160 will create a flashing icon 175 on the bottom of the end user's computer display 130, to politely alert the end user that he or she should respond to the last message from the HP Support Agent soon. Although a flashing icon feature has been described above, one of ordinary skill in the art will recognize that other ways to notify the end user may be contemplated while remaining within the scope of the invention, such as by providing an audible notification and/or other type of visual notification (e.g., small pop-up window on the computer display).

A second embodiment of the invention will now be described in detail, with reference to FIG. 3. In the second embodiment, the HP Monitor periodically creates a browser object to make an http call to an HP Instant Support Server through the Internet, similar to how it was described with respect to the first embodiment. However, in the second embodiment, the HP Monitor utilizes a different polling method than what was done in the first embodiment. In particular, with respect to the second embodiment, the HP Monitor performs "intelligent polling".

In more detail, the likelihood of receiving a reply within a fixed time interval decreases as the elapsed time increases, which is a concept driving the polling procedure performed in the second embodiment. Furthermore, the expectation of responsiveness by the end user decreases over time. That is, if the end user has not received a response from a service engineer assigned to handle his or her problem within the first hour after the problem was initially reported to the service center, then it is likely that the problem is a difficult one to fix, and that the service engineer needs to take some time to determine a solution. On the other side, the fact that the end user has not received a quick response means that the end user likely realizes that he or she will not be getting a response any time soon, and thus his or her expectation for receiving a reply any time soon decreases over time.

The polling strategy utilized in the second embodiment is based on the fact that there is no need to poll as often as time elapses. By implementing a backoff polling strategy in the second embodiment, the HP Monitor matches the decreased expectation of the end user and likelihood of having any messages with a decrease in polling rate. Such a backoff polling strategy is accomplished in step 225 of FIG. 2, whereby the backoff polling strategy as shown in FIG. 3 is implemented, for example. FIG. 3 shows one possible backoff polling implementation that may be used in the second embodiment. In this backoff polling strategy, the HP Monitor opens up a browser object to check for any messages at the HP Instant Support Server 170 every minute for the first hour from the time when the incident was first reported to the support center.

If no message is received in the first hour, then the HP Monitor backs off the polling to only poll every five minutes in the second and third hours from the time when the incident was first reported to the support center. If no message is received within the first three hours, then the HP Monitor backs off the-polling to only poll every fifteen (15) minutes in the fourth through sixth hours from the time when the incident was first reported. Lastly, if no message is received within the first six hours, then the HP Monitor backs off the polling to only poll every thirty (30) minutes in the seventh through ninety-sixth hours from the time when the incident was first reported. If no message is received after 96 hours, then the polling stops.

The HP Monitor implements the backoff strategy shown in FIG. 3 by performing up to 60 queries in the first hour, up to 24 queries in the second and third hours, up to 12 queries in the fourth through sixth hours, and up to 180 queries in the seventh through ninety-sixth hours. With such a backoff polling strategy, a maximum of 276 queries to the Support Server 170 are made by the end user's computer 110 (by way of the HP Monitor running on the end user's computer 110, to be precise).

As compared to the polling performed in the first embodiment, in which a maximum of 5760 queries may be performed (one for each minute in a 96 hour period), an elimination of over 95% of the queries to the Support Server 170 from one end user computer is achieved. This savings results in less traffic on a network (or networks) that passes messages between the end user and the Support Server 170, thereby speeding up traffic flow for all users on the network. Furthermore, this savings results in less burden on the Support Server 170 and on the end user's computer 110, due to the lesser number of message queries over a same period of time. Accordingly, server load is reduced as a result of the second embodiment using a backoff polling strategy that progressively increases the polling interval over time. Furthermore, instant or nearly instant notification to the end user is made by way of the invention according to either the first or second embodiments, to notify the end user of a new message from a support engineer that is awaiting their attention.

In a third embodiment of the invention, which is similar to the second embodiment, a backoff polling strategy is used, whereby a time from a most recently received message from the support server 170 is the criteria to determine the backoff amount, instead of the time from when the first message (initiating the on-line assistance session) was received from the support server 170.

In an implementation of the first, second and third embodiments, when an end user has initiated a session with the support center and has been provided with a unique Case Number for all further message correspondence between a service engineer and the end user for that particular problem to be solved, and then if the end user initiates another session at a later point in time with the support center with respect to a different computer problem to be resolved, all messages between the end user and a service engineer with respect to the later session will be assigned a different unique Case Number than the one assigned for the earlier session. Now, assuming that both problems have not been resolved as yet, then the end user will have two pending sessions with the support center. If the end user then closes his or her browser object that was providing any messages to the end user from the support center to resolve those problems, then an HP Monitor in accordance with any of the embodiments of the invention will be activated to check for messages at the corresponding support server with respect to the pending sessions. In this case, only one instance of the HP Monitor is utilized to handle one or more currently pending sessions, since the HP Monitor is capable of checking the support server for any messages that have unique Case Numbers assigned to them that match the unique Case Numbers corresponding to the two pending matters initiated by the end user, which have yet to be resolved. That way, the end user's computer 110 is not tied-up by multiple HP monitors running at the same time.

While several embodiments have been described herein, modification of the described embodiments may become apparent to those of ordinary skill in the art, following the teachings of the invention, without departing from the spirit and scope of the invention as set forth in the appended claims. For example, the notifying to the end user of a message with respect to his or her computer problem may be accomplished by having the browser pop up on the end user's computer display, and/or by audibly alerting the end user (e.g., "You have a message from the service engineer") that a message from the service engineer is waiting to be read.

What is claimed is:

1. An on-line assistance system, comprising:
    a first computer of one who may require assistance that includes:
        a display;
        a monitoring unit loaded on the first computer; and
        a browser loaded on the first computer and configured to request establishment of an on-line session with a second computer of one in a position to grant assistance when the browser is enabled, said browser leaving behind a Cookie or other record or pertinent user information,
    wherein the monitoring unit, guided by information obtained from this Cookie or other record, periodically monitors the second computer for any messages destined for the first computer when the browser is closed.

2. The on-line assistance system according to claim 1, wherein the browser is enabled by a user activating an icon on the display, and
    wherein the browser provides a direct on-line connection to a support server that is used to provide support to the user in order to fix a problem experienced on the first computer.

3. The on-line assistance system according to claim 2, wherein the direct on-line connection is an http connection.

4. The on-line assistance system according to claim 1, wherein the monitoring unit periodically monitors the second computer by opening a browser object after a predetermined time period has elapsed, wherein if no message for the first computer is found at the second computer by way of the browser object, the browser object is closed.

5. The on-line assistance system according to claim 4, further comprising:
    a backoff timer unit coupled to the monitoring unit, the backoff timer unit determining an elapsed time from when the request to establish an on-line session by way of the browser was made, the backoff timer unit calculating a time amount for reopening the browser from when the browser was most recently reopened, based on the elapsed time.

6. The on-line assistance system according to claim 5, wherein the time amount for reopening the browser increases in proportion to increases in the elapsed time.

7. The on-line assistance system according to claim 5, wherein, in a case where the elapsed time has passed a fixed time amount without detecting any message for the first computer on the second computer, the monitoring unit ceases to re-open the browser.

8. A computer program product that provides for on-line assistance to an end user, the end user having a first computer for communicating with a second computer of one who can offer assistance to the end user over a network, the computer program product comprising:
    a first computer program unit configured to cause a browser object to open a network browser on the first computer;
    a second computer program unit configured to request establishment of an on-line session with the second computer when the network browser is open on the first computer; saving pertinent user information in the form of a Cookie or other record, and
    a third computer program unit guided by the user information obtained from the Cookie or other record and configured to periodically cause the first computer program unit to open the network browser to check for any messages originating from the second computer, coming from one who can offer assistance to the end user, and destined for the first computer when the network browser is closed.

9. The computer program product according to claim 8, wherein the network is an Internet.

10. The computer program product according to claim 8, wherein the network is a combination of a local area network and an Internet, with a firewall provided between the local area network and the Internet, wherein the first computer is provided on the local area network on a first side of the firewall, and wherein the second computer is provided on a second side of the firewall and is not provided on the local area network.

11. The computer program product according to claim 8, wherein the network browser is enabled by a user activating an icon on the display, and
    wherein the network browser provides a direct on-line connection to a support server that is directly coupled to the second computer and that is used to provide support to the user in order to assist the user in addressing a problem experienced on the first computer.

12. The computer program product according to claim 11, wherein the direct on-line connection is an http connection.

13. The computer program product according to claim 8, wherein the third computer program unit, by periodically opening the first computer program unit causes a periodic monitoring of the second computer by way of the network browser, wherein if no message for the first computer is found that originated from the second computer, the browser is closed.

14. The computer program product according to claim 8, further comprising:

a fourth computer program unit configured to determine an elapsed time from when the request to establish the on-line session from the first computer to the second computer by way of the browser was made, the fourth computer program unit configured to calculate a time amount for reopening the network browser from when the network browser was most recently reopened, based on the elapsed time.

15. A method for obtaining on line help for a first computer, comprising:

opening a browser loaded on the first computer of one seeking assistance to request establishment of an on line session between the first computer and a second computer of one in a position to offer assistance;

assigning a unique case number for the requested session, the unique case number also being assigned to a particular problem to be resolved on the first computer;

sending at least one message between a first user of the first computer and a second user of the second computer, in order to try to resolve the problem;

saving pertinent user information on the first computer in the form of a Cookie or other record, determining, at the first computer, when the browser is closed, a time from when the on line connection was first established; and periodically reopening, at the first computer, when the browser is closed, the browser in order to check for any messages having the unique case number assigned thereto at a server that is utilized by the second computer for storing messages, guided by the user information obtained from the Cookie or other record.

16. The method according to claim 15, wherein the browser is enabled by a user activating an icon on a display of the first computer, and wherein the browser provides a direct on-line connection to a support server that is directly coupled to the second computer and that is used to provide support to the user in order to assist the user in addressing a problem experienced on the first computer.

17. The method according to claim 16, wherein the direct on-line connection is an http connection.

18. The method according to claim 15, wherein the periodic reopening step results in a periodic monitoring of the second computer by way of the browser, wherein if no message for the first computer is found at the server by way of the browser, the browser is closed.

19. The method according to claim 15, further comprising:

determining an elapsed time from when the request to establish an on-line session from the first computer to the second computer by way of the browser was made, and calculating a time amount for reopening the network browser from when the browser was most recently reopened in the periodic reopening step, based on the elapsed time.

20. The method according to claim 19, wherein the time amount for reopening the browser increases in proportion to increase in the elapsed time.

21. An apparatus for providing on-line assistance to an end user, the end user having a first computer for communicating with a second computer of one in a position to offer assistance over a network, the apparatus comprising:

means for causing a browser object to open a network browser on the first computer;

means for requesting the establishment of an on-line session with the second computer when the network browser is open on the first computer, saving pertinent user information in the form of a Cookie or other record; and means for periodically causing the first computer program unit to open the network browser to check for any messages from the second computer destined for the first computer when the network browser is closed, guided by the pertinent user information obtained from the Cookie or other record.

* * * * *

UNITED STATES PATENT AND TRADEMARK OFFICE
CERTIFICATE OF CORRECTION

PATENT NO. : 7,353,264 B2  Page 1 of 1
APPLICATION NO. : 10/293091
DATED : April 1, 2008
INVENTOR(S) : Rajpal Singh Gill et al.

It is certified that error appears in the above-identified patent and that said Letters Patent is hereby corrected as shown below:

In column 7, line 42, in Claim 1, after "request" insert -- the --.

In column 7, line 45, in Claim 1, after "record" delete "or" and insert -- of --, therefor.

In column 8, line 24, in Claim 8, after "request" insert -- the --.

In column 8, line 27, in Claim 8, delete "computer;" and insert -- computer, --, therefor.

In column 8, line 28, in Claim 8, delete "record," and insert -- record; --, therefor.

In column 8, line 61, in Claim 13, after "unit" insert -- , --.

In column 9, line 12, in Claim 15, after "request" insert -- the --.

In column 9, line 22, in Claim 15, delete "record," and insert -- record; --, therefor.

Signed and Sealed this

Nineteenth Day of August, 2008

JON W. DUDAS
*Director of the United States Patent and Trademark Office*